Oct. 13, 1942.   O. S. DE CAUSSE   2,298,528
ELECTRICAL PROCESS FOR BREAKING STEEL BARS
Filed Jan. 8, 1942
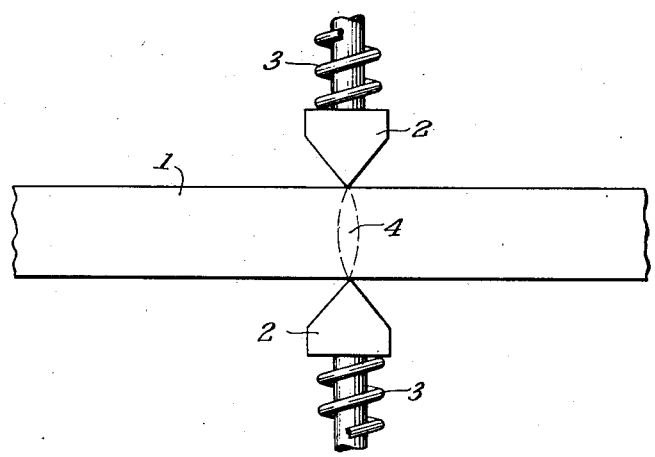
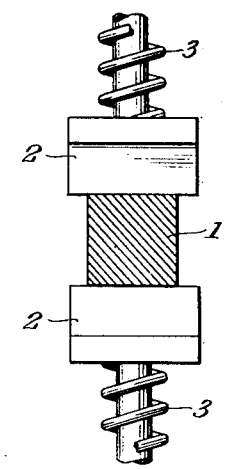
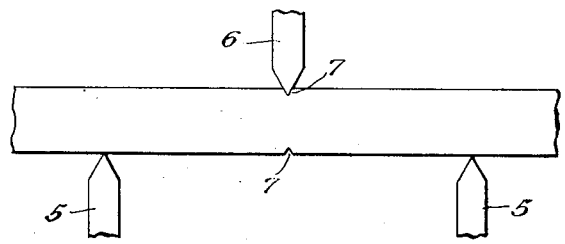
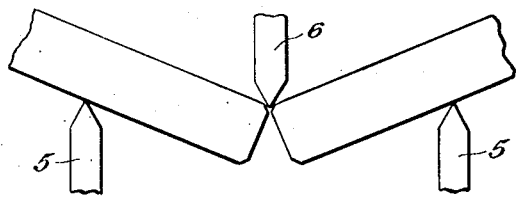
INVENTOR
Octave S. de Causse
BY Benjamin Tomlin
ATTORNEY Patented Oct. 13, 1942

2,298,528

UNITED STATES PATENT OFFICE 2,298,528

ELECTRICAL PROCESS FOR BREAKING STEEL BARS

Octave S. de Causse, New York, N. Y.

Application January 8, 1942, Serial No. 425,949

3 Claims. (Cl. 219—1)

This invention relates to an electrical process for breaking steel bars of any cross-section and of any dimensions, without waste of metal.

The process consists in subjecting the bar, at the place or places where it is intended to be broken, to local heat treatment or hardening, the same being limited to a very small width of the cross-section but reaching practically throughout said cross-section of the bar.

The object of said heat treatment is to change the molecular structure of the steel, at the desired place, causing the molecules to lose their elasticity and become brittle and also to set up high molecular stresses throughout the cross-section of the bar at the point treated, whereupon the bar will break, cleanly and squarely at the desired place, if subjected to a shock by impact or pressure, applied normally to the bar at the point treated, the bar resting upon two suitably spaced stays or rests.

The above result will be obtained if a small width of the cross-section of the bar is very rapidly heated by electricity to a temperature high enough for the steel molecules in that area to harden, through being chilled by contact with the surrounding molecules of the bar, which have remained cold during the local heating operation, when the electric current has been interrupted.

To obtain this locally limited heat treatment, low voltage high amperage D. C. or A. C. current is used and applied at the place where the break is desired, by means of two or more knife-edge electrodes, preferably made of low electrical resistance but high mechanical resistance metal, such as a copper-tungsten alloy, water cooled, brought into contact with the bar on two opposite sides and strictly on the same plane, perpendicularly to the bar. These electrodes are preferably shaped to fit the bar, as the latter may be round, square, or of any other cross-section, and it is advisable that the electric current crosses the greatest possible cross-section of the bar.

As in the case of electrical spot or seam welding, if the voltage is suitably regulated, the electric current running through the cross-section of the bar will not go much beyond the area included between the electrodes and, with suitable amperage available, this current will very rapidly bring the portion of the bar situated between said electrodes to a very high temperature, suitable to obtain the hardening-by-chill effect desired. This heating operation should not require more than a few seconds.

As soon as the cross-section of the bar at the treated area has become red-hot, the current must be interrupted, before the surrounding portion of the bar becomes hot by conductance, otherwise no chilling effect can be obtained and the bar will not break at the desired place, if at all.

In order to indicate the point treated and to ficilitate the precision of the break at the desired place, by creation of a point of failure, it is advisable to produce a small indentation or nick in the middle of the treated or hardened area on the surface of the bar, and this can be done by maintaining a constant pressure on one or several of the knife-edge electrodes, which will cause said electrodes to sink slightly into the bar at the desired place, as soon as the portion of the bar in contact with the electrodes has become red-hot and consequently soft.

This process is particularly applicable to steel containing a certain percentage of carbon, such as shell or semi-hard steel, tool steel, etc., but it is also applicable to low-carbon steel and even to iron bars, the chill effect producing a disturbance in the molecular structure, which creates stresses tending to break the bar, as in case of carbon steel bars.

Alloy-steel bars may also be satisfactorily broken by use of this process, as may in fact any ferrous or non-ferrous metal which is likely to harden locally when chilled.

In the accompanying drawing,

Fig. 1 is an elevational view illstrating the electrodes used in this invention in connection with operation upon a square bar.

Fig. 2 is an end elevation of the bar and electrodes shown in Fig. 1.

Fig. 3 is an elevational view, in a reduced scale, showing how the bar in Fig. 1 is supported for the breaking operation.

Fig. 4 is a view similar to Fig. 3, showing the bar breaking under action of the pressure or impact applied perpendicularly at the treated area.

1 is the bar, 2 the electrodes, 3 designates the springs exerting a constant pressure upon the electrodes 2, and 4 represents the approximate area traversed by the low-voltage high amperage electric current. 5 designates the two supports on which the bar rests, and which should be situated both at the same distance from the centre of the treated area. 6 is a breaking tool, which is attached to a press or drop-hammer, not shown, for the breaking operation. 7 represents the small notches produced by the electrodes 2 sinking into the surface of the bar 1 through the pressure exerted by the springs 3, as soon as the heated area becomes soft.

Variations may be resorted to within the scope of the invention.

Having thus described my invention, I claim:

1. A process for breaking a metallic bar characterized by simultaneously applying under pressure at the place of intended fracture a plurality of electrodes opposite to each other and upon the surface of the bar, said electrodes carrying low voltage high amperage current of sufficient capacity to traverse substantially through the cross-sectional area included between said electrodes and create a brittle state of said cross-section, and then applying pressure transversely against said bar at said cross-sectional area to fracture the bar.

2. A process for breaking a metallic bar, as in claim 1 further characterized by said electrodes being knife-edged.

3. A process for breaking a metallic bar characterized by simultaneously applying under pressure at the place of intended fracture a plurality of electrodes opposite to each other and upon the surface of the bar, said electrodes carrying low voltage high amperage current of sufficient capacity to traverse substantially through the cross-sectional area included between said electrodes and create a brittle state of said cross-section, said electrodes producing indentations in said bar by the combined action of said pressure and current, and then applying pressure transversely against said bar at said cross-sectional area to fracture the bar.

OCTAVE S. DE CAUSSE.